US008605449B2

(12) United States Patent
Bussa et al.

(10) Patent No.: US 8,605,449 B2
(45) Date of Patent: Dec. 10, 2013

(54) ELECTRONIC CONTROL UNIT

(75) Inventors: Marco Bussa, Viarigi (IT); Giovanni Delsant, Ferrere (IT)

(73) Assignee: Gate S.R.L., Turin (IT)

( * ) Notice: Subject to any disclaimer, the term of this patent is extended or adjusted under 35 U.S.C. 154(b) by 293 days.

(21) Appl. No.: 13/085,087

(22) Filed: Apr. 12, 2011

(65) Prior Publication Data

US 2011/0249413 A1    Oct. 13, 2011

(30) Foreign Application Priority Data

Apr. 13, 2010    (IT) .............................. TO2010U0064

(51) Int. Cl.
*H05K 5/00*    (2006.01)
*F04B 49/00*    (2006.01)

(52) U.S. Cl.
CPC ................................... *F04B 49/007* (2013.01)
USPC .......................................... 361/752; 361/736

(58) Field of Classification Search
CPC .......... F04B 49/007; H02G 3/088; H02G 3/16
USPC ............ 361/752, 736, 644, 641; 174/521, 50, 174/58; 439/76.2, 949
See application file for complete search history.

(56) References Cited

U.S. PATENT DOCUMENTS

| 5,751,058 | A  | * | 5/1998  | Matsuki ......................... 257/692 |
| 6,108,202 | A  | * | 8/2000  | Sumida ......................... 361/690 |
| 6,848,916 | B2 | * | 2/2005  | Nakayama et al. .......... 439/76.2 |
| 7,085,138 | B2 |   | 8/2006  | Origlia |
| 2005/0068750 | A1 | * | 3/2005 | Origlia ......................... 361/752 |
| 2008/0245565 | A1 | * | 10/2008 | Bielesch ..................... 174/72 A |

* cited by examiner

*Primary Examiner* — Yuriy Semenenko
(74) *Attorney, Agent, or Firm* — Muncy, Geissler, Olds & Lowe, PLLC

(57) ABSTRACT

An electronic control unit, has a casing accommodating a printed circuit board. The casing has a molded plastic intermediate structure having a frame. Two electrically conductive members are partially embedded in the intermediate structure during the course of molding and are connected to the printed circuit board forming output terminals of the control unit. Two flexible conductors, provided with corresponding electrically insulating coverings, connect the control unit to an apparatus to be controlled. Each conductor has an end permanently connected to a respective one of the conductive members and the connection between the conductors and the conductive members are covered and sealed in a fluid-tight way by an electrically insulating material.

20 Claims, 5 Drawing Sheets

ELECTRONIC CONTROL UNIT

CROSS REFERENCE TO RELATED APPLICATIONS

This non-provisional patent application claims priority under 35 U.S.C. §119(a) from Utility Model Application No. TO2010U000064 filed in Italy on Apr. 13, 2010.

FIELD OF THE INVENTION

The present invention relates to an electronic control unit, particularly a speed control unit for an electric fan.

BACKGROUND OF THE INVENTION

More specifically, the invention relates to an electronic control unit comprising: a printed circuit board on which a plurality of electrical and/or electronic components are mounted, a containing and support structure of molded plastic material, at least two electrically conductive members being partially incorporated in a peripheral housing of this structure during the course of moulding, and being connected to the printed circuit board to act as output terminals of the control unit, and a multistrand connecting cable including at least one pair of flexible conductors provided with corresponding electrically insulating coverings, each conductor being connected to one of said output terminals for connection to an apparatus controlled by the control unit.

An electronic control unit of this type is described and illustrated in U.S. Pat. No. 7,085,138 held by the present applicant. For the purpose of connection to a controlled apparatus, this prior art control unit has a specific connector formation, of the female type for example, into which can be inserted a corresponding connector element, of the male type for example, which is connected to the end of a multistrand connecting cable.

This solution can give rise to problems of water infiltration, leading to a loss of insulation in the output connector.

SUMMARY OF THE INVENTION

Hence there is a desire for an electronic control unit which enables this problem to be overcome.

Accordingly, in one aspect thereof, the present invention provides an electronic control unit, comprising: a printed circuit board on which a plurality of electrical and/or electronic components are mounted, a casing containing the printed circuit board and comprising an intermediate structure of molded plastic material having a frame, at least two electrically conductive members partially incorporated in the intermediate structure during the course of molding and connected to said printed circuit board, and at least two flexible conductors provided with corresponding electrically insulating coverings for connection to an apparatus controlled by the control unit, each conductor having an end permanently connected to a respective one of the conductive members, the connection between the conductors and the conductive members being covered and sealed in a fluid-tight way by an electrically insulating material.

Preferably, a peripheral compartment is formed in the intermediate structure, the ends of the conductors extend into the compartment where they are permanently connected to the conductive members, and the electrically insulating material fills the compartment.

Preferably, each of the conductive members is L shape, comprising a first branch and a second branch that are substantially perpendicular to each other, the first branch being incorporated in a fluid-tight way with the intermediate structure, the second branch extending within the compartment.

Preferably, the intermediate structure comprises two peripheral formations which face each other and which are spaced from each other with a gap formed between them, and the conductors extend from outside to inside of the casing through the two peripheral formations, the conductors, with their electrically insulating coverings, being incorporated in a fluid-tight way in said formations during the course of the molding of the intermediate structure.

Preferably, the gap is sealed in a fluid-tight way with an electrically insulating material which covers and seals the electrically insulating coverings of said conductors in said gap.

Preferably, the conductors are connected to the conductive members by soldering, welding or brazing.

Preferably, the electrically insulating material is a synthetic resin, especially a silicone resin or an epoxy resin.

Preferably, the flexible conductors form a multistrand connecting cable.

Preferably, the conductive members form output terminals of the control unit.

Preferably, the control unit is a speed control unit for an electric fan, especially an electric fan of a vehicle engine cooling system.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENT

Figure 1:
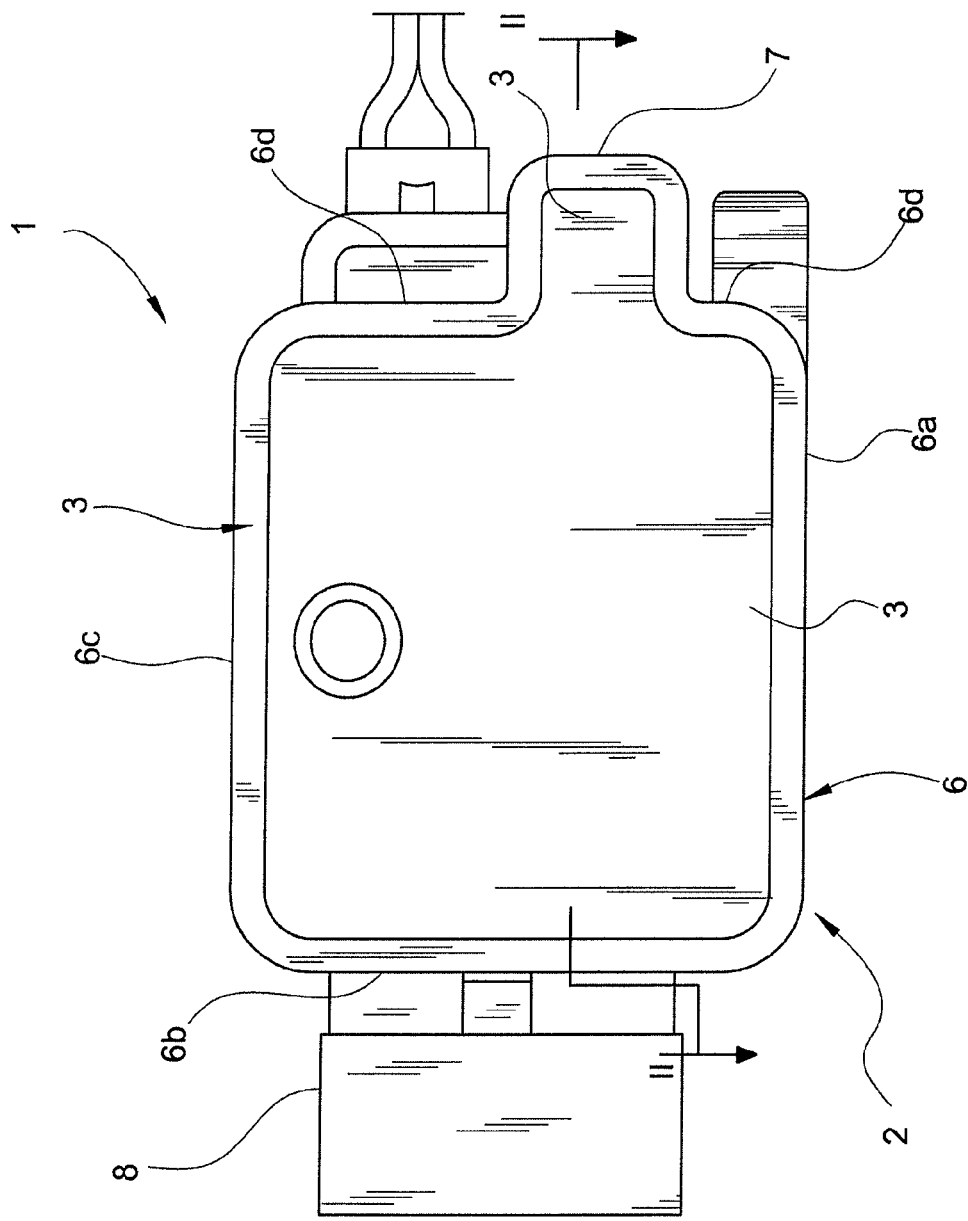
FIG. 1 is a plan view from above of an electronic control unit according to the present invention, shown in the assembled condition.
Figure 2:
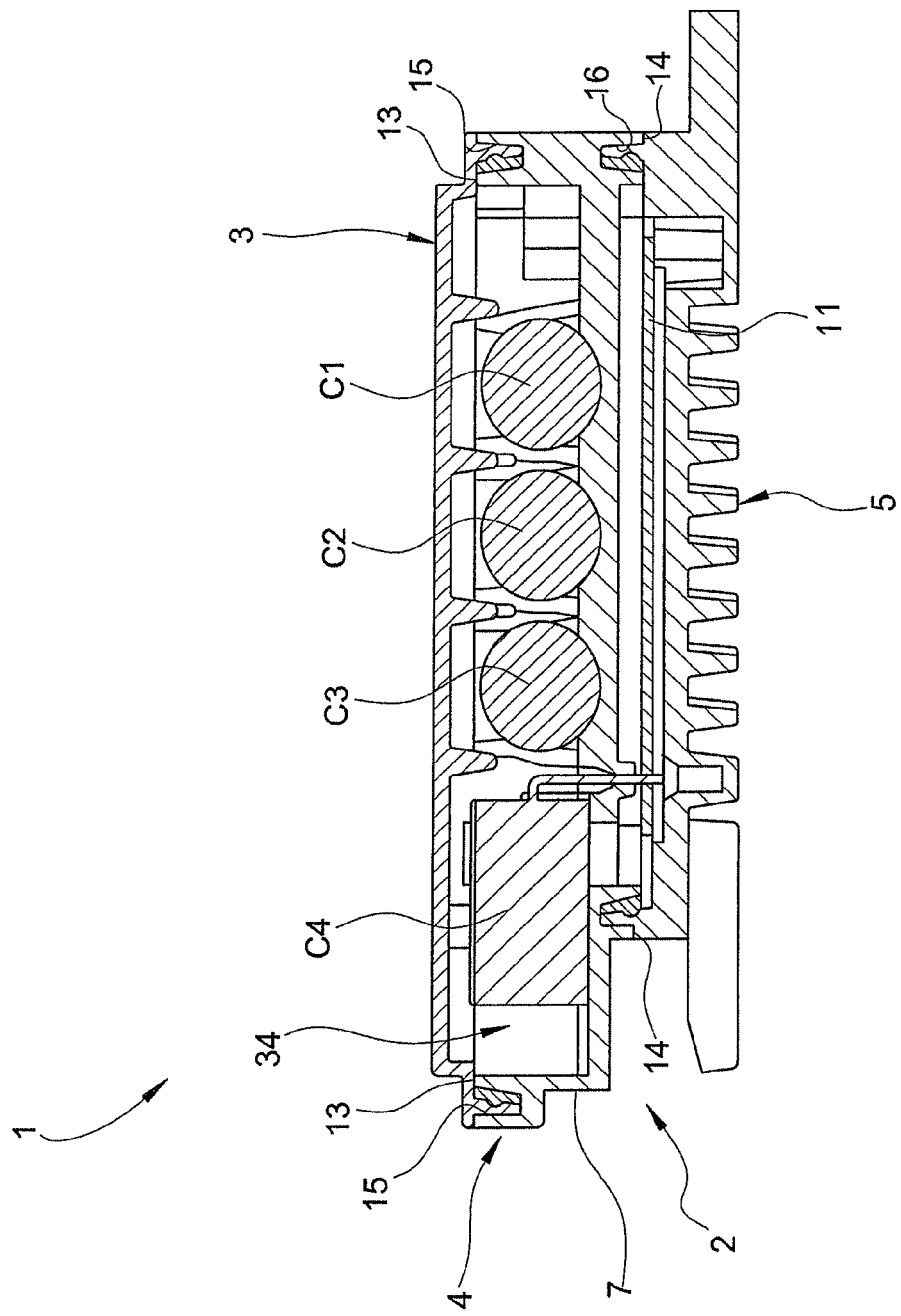
FIG. 2 is a sectional view taken along the line II-II of FIG. 1.

In the drawings, and particularly in FIGS. 1 and 2, reference numeral 1 indicates the whole of an electronic control unit according to the preferred embodiment of the present invention. In the illustrated exemplary embodiment, the control unit 1 is a unit for regulating or controlling the rotational speed of an electric fan, particularly a fan for motor vehicles, especially for a vehicle engine cooling system. However, the invention is not limited to this specific application.

The unit 1 comprises a casing indicated as a whole by 2. In the illustrated embodiment, this casing essentially comprises a top cover 3 made from plastic material, such as PBT (polybutylene terephthalate), an intermediate structure 4 (FIG. 2) also made from molded plastic material such as PBT, and a heat sink 5 (FIG. 2) made from metal, such as aluminum or an aluminum alloy, which also acts as the bottom cover.

Figure 3:
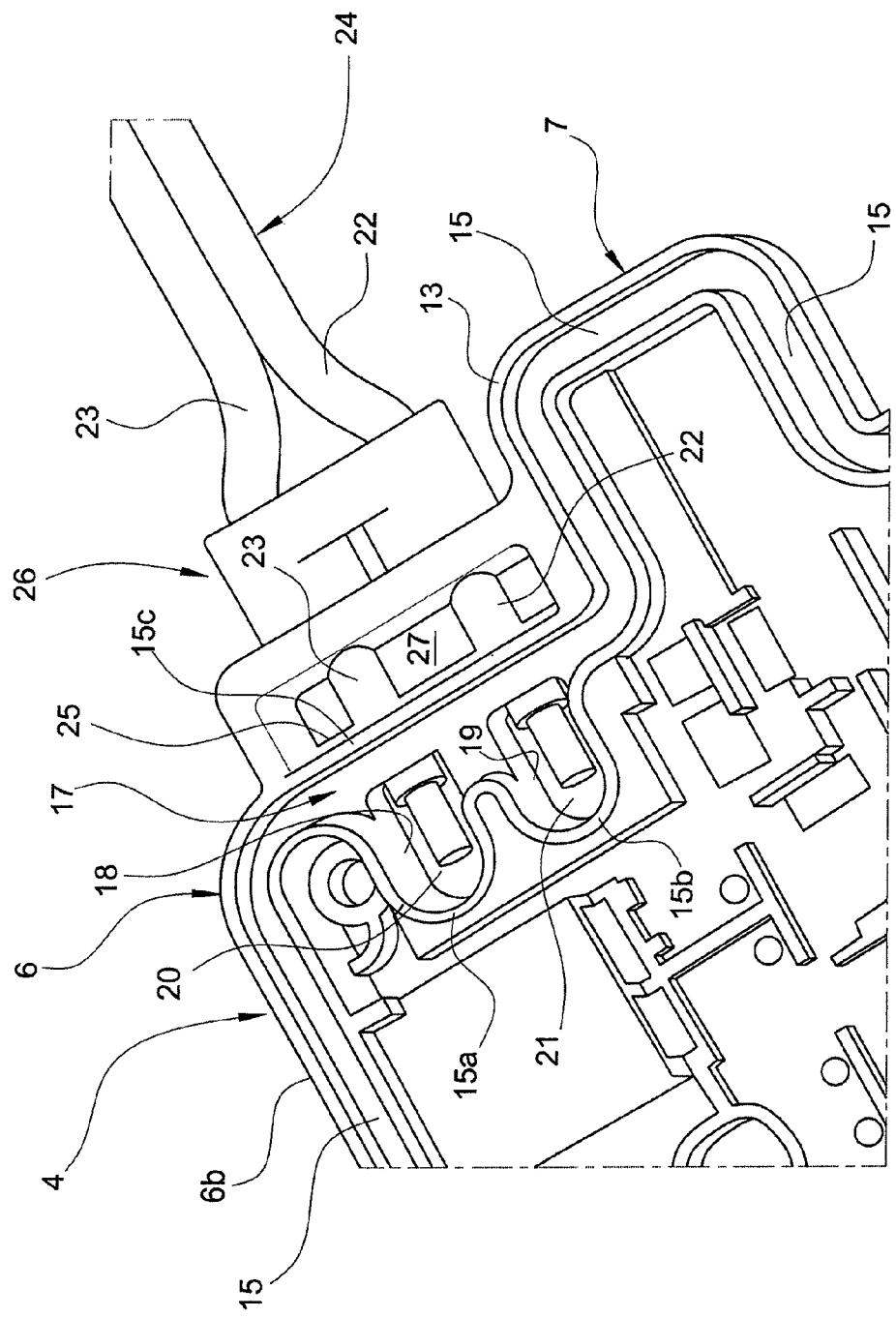
FIG. 3 is a perspective view of a peripheral portion of a containing or support structure or frame of the control unit of FIG. 1, showing the area of connection to a multistrand connecting cable.
Figure 5:
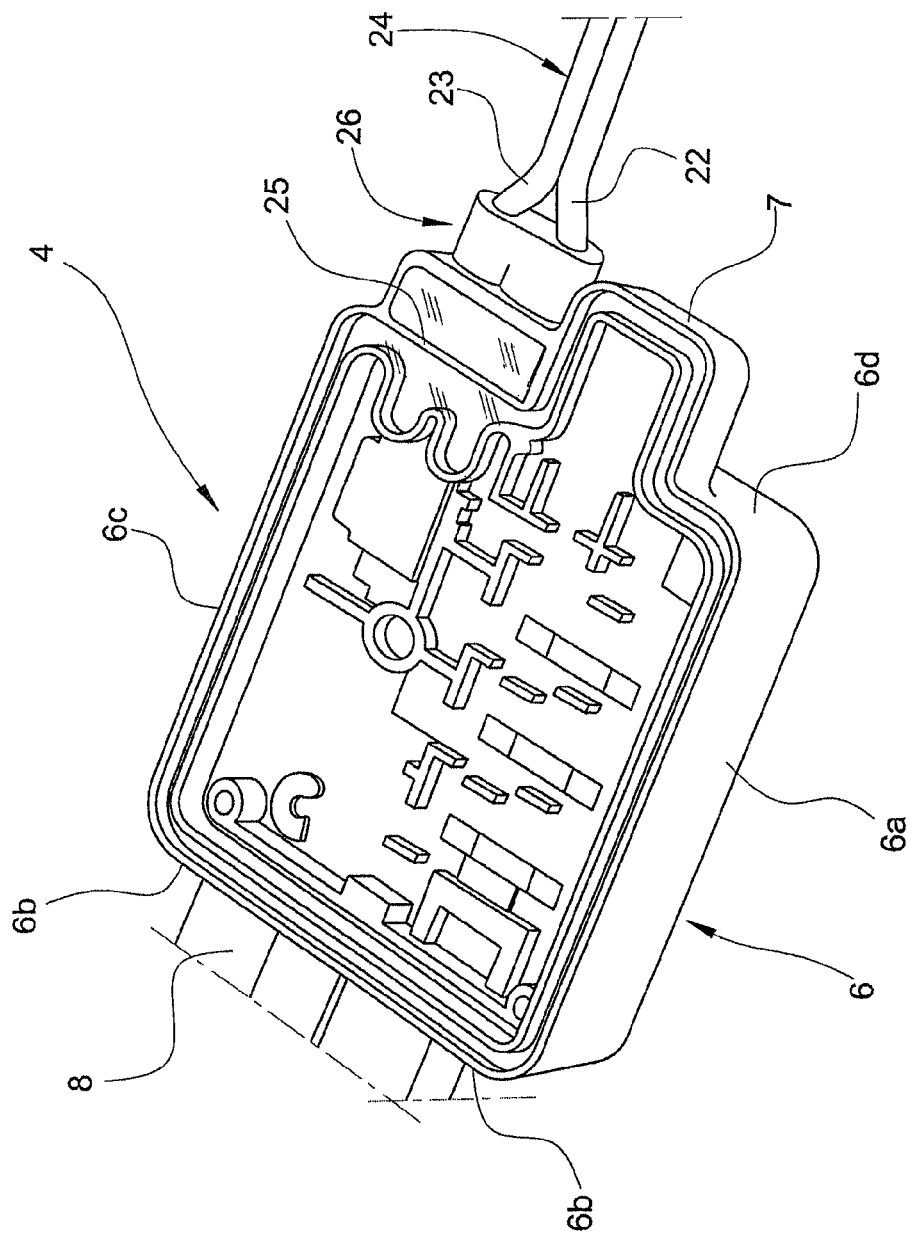
FIG. 5 is a further partial perspective view showing the containing and support structure on completion of the sealing of the area of connection of the multistrand cable to the output terminals of the control unit of FIG. 1.

As shown particularly in FIGS. 3 and 5, the intermediate structure 4 comprises a frame 6 and a support portion. The frame 6 is substantially rectangular with three essentially rectilinear sides 6a, 6b and 6c and a fourth side 6d which has an outwardly projecting appendage 7. On the side 6b opposite the side 6d, the frame 6 has a multi terminal electrical input connector, indicated as a whole by 8 in FIGS. 1 and 5. The frame 6 has two opposing perimetric edges 13 and 14 (FIG. 2), forming the upper and lower edges respectively, in which corresponding recesses or grooves indicated by 15 and 16 are formed. These recesses or grooves 15 and 16 are engaged by corresponding projecting edges of the top cover 3 and of the heat sink 5, with the interposition of a sealing material cast into the grooves, such as a synthetic resin, particularly a silicone resin or an epoxy resin.

The electronic control unit 1 comprises a printed circuit board or card 11 (FIG. 2) on which are mounted a plurality of electrical and/or electronic components, particularly those known as SMDs. FIG. 2 shows, in particular, capacitors indicated by C1, C2, C3 and C4. Capacitor C4 is disposed in a niche 34 formed in the appendage 7 described above. The printed circuit board 11 may carry other components, particularly active components such as MOSFETs or similar transistors, and associated components.

For details of the procedures for arranging and connecting the components carried by the printed circuit board 11, reference may be made, for example, to the U.S. Pat. No. 7,085,138 mentioned above.

With reference to FIG. 3, a portion of the inner wall of the groove 15 adjacent to the appendage 7 forms two adjacent bays 15a and 15b which, in combination with each other and with the facing portion 15c of the outer wall of said groove, form a compartment 17 essentially in the shape of a letter B. In the bays 15a and 15b, the base wall of the compartment 17 includes corresponding recesses 18 and 19, in which corresponding electrically conductive members 20 and 21 are incorporated during the course of molding the frame 6.

Figure 4:
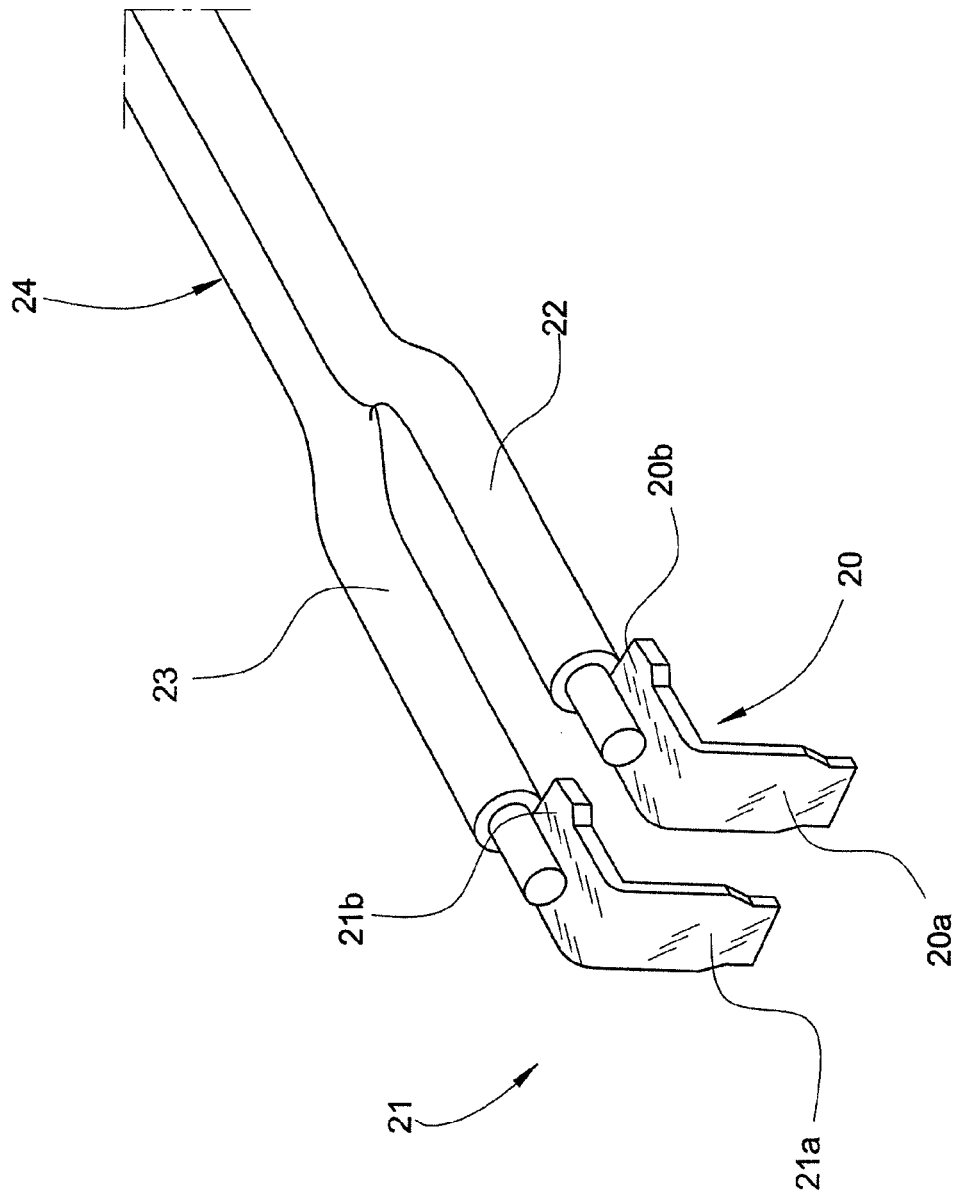
FIG. 4 is a partial perspective view showing the connection between the ends of the multistrand connecting cable and output terminals of the control unit of FIG. 1.

As shown in FIG. 4, the electrically conductive members 20 and 21 in the illustrated embodiment are shaped in the form of a letter L, having corresponding essentially vertical branches 20a and 21a, and corresponding essentially horizontal branches 20b and 21b. The branches 20a and 21a of the members 20 and 21 are incorporated in the frame 6, and their lower ends are connected to the printed circuit board 11. The electrically conductive members 20 and 21 form, in particular, the output terminals of the electronic control unit 1.

The branches 20b and 21b of the members 20 and 21 are permanently connected, by soldering, welding or brazing for example, to the ends of corresponding conductors 22 and 23 of a multistrand cable indicated as a whole by 24 in FIGS. 3 to 5. This multistrand cable 24 is intended to provide a connection between the electronic control unit 1 and a controlled apparatus such as an electric fan (not shown).

Each of the conductors 22 and 23 of the cable 24 is provided with a corresponding electrically insulating covering. These conductors 22 and 23 extend from the outside to the inside of the casing 2 through two peripheral formations or walls of the frame 6, indicated by 25 and 26 in FIGS. 3 and 5. These formations face each other and are spaced from each other, in such a way that a gap 27 is formed between them (FIG. 3). The conductors 22 and 23 of the cable 24, with their electrically insulating coverings, are incorporated in a fluid-tight way in the formations 25 and 26 during the course of molding the frame 6.

As shown in FIG. 3 in particular, the ends of the conductors 22 and 23 inside the frame 6 extend into the compartment 17, and, in particular, into the recesses 18 and 19 thereof, and are permanently connected therein to the output terminals 20 and 21, as mentioned previously. The compartment 17 and the associated recesses 18 and 19 are then filled and sealed in a fluid-tight way with a quantity of electrically insulating material, particularly the same synthetic resin as that which is cast into the groove 15 of the upper edge 13 of the frame 6. The connections between the output terminals 20 and 21 and the conductors 22 and 23 are thus effectively embedded in and sealed by the electrically insulating material.

Conveniently, the gap 27 formed between the formations 25 and 26 of the frame 6 is also filled and sealed with a quantity of electrically insulating sealing material, particularly the same resin as that which is used for the groove 15 and the compartment 17. Thus the portions of the electrically insulating coverings of the conductors 22 and 23 which extend into the gap 27 are effectively covered and sealed.

The solution described above enables a triple barrier to be provided against the infiltration of water towards the connection between the cable 24 and the output terminals 20 and 21 of the control unit 1, since a first barrier is formed by the use of synthetic resin to seal the gap 27 around the electrically insulating coverings of the conductors 22 and 23, a second barrier is provided by the over molding of the plastic material of the frame 6 on to the coverings of the conductors 22 and 23, in the area of the formations 25 and 26, and a third barrier is created by the use of synthetic resin to form a seal in the compartment 17.

Although the invention is described with reference to one or more preferred embodiments, it should be appreciated by those skilled in the art that various modifications are possible. Therefore, the scope of the invention is to be determined by reference to the claims that follow.

In the description and claims of the present application, each of the verbs "comprise", "include", "contain" and "have", and variations thereof, are used in an inclusive sense, to specify the presence of the stated item but not to exclude the presence of additional items.

The invention claimed is:

1. An electronic control unit, comprising:
   a printed circuit board on which a plurality of electrical and/or electronic components are mounted,
   a casing containing the printed circuit board and comprising an intermediate structure of molded plastic material having a frame,
   at least two electrically conductive members partially incorporated in the intermediate structure during the course of molding and connected to said printed circuit board, and
   at least two flexible conductors provided with corresponding electrically insulating coverings for connection to an apparatus controlled by the control unit, each conductor having an end permanently connected to a respective one of the conductive members, the connection between the conductors and the conductive members being covered and sealed in a fluid-tight way by an electrically insulating material;
   wherein a peripheral compartment is formed in the intermediate structure, the ends of the conductors extend into the compartment where they are permanently connected to the conductive members, and the electrically insulating material fills the compartment.

2. The control unit of claim 1, wherein the intermediate structure comprises two peripheral formations which face each other and which are spaced from each other with a gap formed between them; and wherein the conductors extend from outside to inside of the casing through the two peripheral formations, the conductors, with their electrically insulating coverings, being incorporated in a fluid-tight way in said formations during the course of the molding of the intermediate structure.

3. The control unit of claim 1, wherein the intermediate structure comprises two peripheral formations which face each other and which are spaced from each other with a gap formed between them; and wherein the conductors extend from outside to inside of the casing through the two peripheral formations, and said gap is sealed in a fluid-tight way with an electrically insulating material which covers and seals the electrically insulating coverings of said conductors in said gap.

4. The control unit of claim 1, wherein the conductors are connected to the conductive members by soldering, welding or brazing.

5. The control unit of claim 1, wherein the electrically insulating material is a synthetic resin, especially a silicone resin or an epoxy resin.

6. The control unit of claim 5, wherein the synthetic resin is a silicone resin or an epoxy resin.

7. The control unit of claim 1, wherein the conductors form a multistrand connecting cable.

8. The control unit of claim 1, wherein each of the conductive members is L shape, comprising a first branch and a second branch that are substantially perpendicular to each other, the first branch being incorporated in a fluid-tight way with the intermediate structure, the second branch extending within the compartment.

9. The control unit of claim 1, wherein the conductive members form output terminals of the control unit.

10. The control unit of claim 1, wherein the control unit is a speed control unit for an electric fan.

11. The control unit of claim 1, wherein the control unit is a speed control unit for an electric fan of a vehicle engine cooling system.

12. The control unit of claim 1, wherein the compartment is substantially B-shaped.

13. The control unit of claim 1, wherein the intermediate structure comprise at least one periphery formation, and wherein the conductors, with their electrically insulating coverings, being incorporated in a fluid-tight way in said formations during the course of the molding of the intermediate structure.

14. An electronic control unit, comprising:
a printed circuit board on which a plurality of electrical and/or electronic components are mounted;
a casing containing the printed circuit board and comprising an intermediate structure of molded plastic material, the intermediate structure comprising two peripheral formations which face each other and which are spaced from each other with a gap formed between them;
at least two electrically conductive members partially incorporated in the intermediate structure during the course of molding and connected to said printed circuit board; and
at least two flexible conductors provided with corresponding electrically insulating coverings for connection to an apparatus controlled by the control unit, each conductor having an end electrically connected to a respective one of the conductive members, the connection between the conductors and the conductive members being covered and sealed in a fluid-tight way by an electrically insulating material;
wherein the conductors extend from outside to inside of the casing through the two peripheral formations, the conductors, with their electrically insulating coverings, being incorporated in a fluid-tight way in said formations during the course of the molding of the intermediate structure.

15. The control unit of claim 14, wherein said gap is sealed in a fluid-tight way with an electrically insulating material which covers and seals the electrically insulating coverings of said conductors in said gap.

16. The control unit of claim 14, wherein a peripheral compartment is formed in the intermediate structure, the ends of the conductors extend into the compartment and connected to the conductive members, and the electrically insulating material fills the compartment.

17. The control unit of claim 16, wherein the compartment is substantially B-shaped and formed at an inner one of the peripheral formations.

18. An electronic control unit, comprising:
a printed circuit board on which a plurality of electrical and/or electronic components are mounted;
a casing containing the printed circuit board and comprising an intermediate structure of molded plastic material, the intermediate structure comprising two peripheral formations which face each other and which are spaced from each other with a gap formed therebetween, and said gap being sealed in a fluid-tight way with an electrically insulating material;
at least two electrically conductive members received in the intermediate structure and connected to the printed circuit board; and
at least two flexible conductors provided with corresponding electrically insulating coverings extending into the casing through the peripheral formations and being covered by the electrically insulating material, each conductor having an end connected to a respective one of the conductive members, the connection between the conductors and the conductive members being covered and sealed in a fluid-tight way.

19. The control unit of claim 18, wherein a peripheral compartment is formed in the intermediate structure, the ends of the conductors extend into the compartment where they are connected to the conductive members, and the compartment is filled by an electrically insulating material.

20. The control unit of claim 19, wherein the compartment is substantially B-shaped and formed at an inner one of the peripheral formations.

* * * * *